United States Patent [19]
Sprowl

[11] Patent Number: 5,690,882
[45] Date of Patent: Nov. 25, 1997

[54] METHOD FOR MAKING A TAMPER INDICATING PACKAGE

[75] Inventor: Frank L. Sprowl, Sturgis, Mich.

[73] Assignee: Owens-Illinois Closure Inc., Toledo, Ohio

[21] Appl. No.: 486,094

[22] Filed: Jun. 7, 1995

Related U.S. Application Data

[62] Division of Ser. No. 38,152, Mar. 26, 1993, Pat. No. 5,443,171.

[51] Int. Cl.⁶ .......................... B65D 51/00; B29C 53/02
[52] U.S. Cl. .................... 264/295; 215/252; 264/296; 264/320; 264/339
[58] Field of Search ........................ 264/296, 295, 264/320, 339; 215/252

[56] References Cited

U.S. PATENT DOCUMENTS

| | | | |
|---|---|---|---|
| Re. 33,265 | 7/1990 | Gregory | 215/252 |
| 3,812,991 | 5/1974 | Wurl | 215/252 |
| 4,394,918 | 7/1983 | Grussen | 215/252 |
| 4,470,513 | 9/1984 | Ostrowsky | 215/252 |
| 4,478,343 | 10/1984 | Ostrowsky | 215/252 |
| 4,506,795 | 3/1985 | Herr | 215/252 |
| 4,526,282 | 7/1985 | Dutt | 215/252 |
| 4,550,844 | 11/1985 | Lininger | 215/252 |
| 4,653,657 | 3/1987 | Papavasilopoulos | 215/252 |
| 4,721,218 | 1/1988 | Gregory | 215/252 |
| 4,732,289 | 3/1988 | Granat | 215/252 |
| 4,796,770 | 1/1989 | Begley | 215/252 |
| 4,801,030 | 1/1989 | Barriac | 215/252 |
| 4,801,031 | 1/1989 | Barriac | 215/252 |
| 4,807,771 | 2/1989 | Roy | 215/252 |
| 4,981,230 | 1/1991 | Marshall | 215/252 |
| 5,007,545 | 4/1991 | Imbery, Jr. | 215/252 |
| 5,050,753 | 9/1991 | Trump et al. | 215/252 |
| 5,090,788 | 2/1992 | Ingram | 215/252 |
| 5,219,507 | 6/1993 | Ingram et al. | 264/296 |
| 5,310,069 | 5/1994 | Ingram et al. | 215/252 |
| 5,370,520 | 12/1994 | Ingram et al. | 264/295 |
| 5,443,171 | 8/1995 | Sprowl | 215/252 |
| 5,462,184 | 10/1995 | Ingram et al. | 215/22 |

FOREIGN PATENT DOCUMENTS

| | | | |
|---|---|---|---|
| 0570760 | 11/1993 | European Pat. Off. | 215/252 |
| 616951 | 9/1994 | European Pat. Off. | 215/252 |

*Primary Examiner*—Jan H. Silbaugh
*Assistant Examiner*—Mark Eashoo

[57] ABSTRACT

A method of making a tamper indicating package comprising a container having a neck with a threaded finish, an annular bead on the neck, a plastic closure which includes a base wall and a depending peripheral skirt having threads interengaging the threads of the container, and a tamper indicating band attached to the skirt by a plurality of weakened portions defining a line of severing. An annular flange extends axially upwardly and inwardly from the tamper indicating band toward the base wall of the closure and includes a first continuous annular flange portion connected to the band by a hinge portion and a second portion. The second portion includes a plurality of segment portions extending upwardly and inwardly from the first continuous portion with the free ends of the segment portions engaging beneath the bead on the container when the closure is threaded onto the container. The flange is bent intermediate its ends so that the second portion extends inwardly at a greater angle than the first continuous flange portion. The segments are separated by narrow slits such that when the closure is fully applied on a container, and the closure is rotated to remove the closure, the free ends of the adjacent segment portions engage a bead on the container and are moved radially inwardly and the sides of the slits adjacent the free ends contact one another in an interfering manner to inhibit reversal of the segment portions and enhance resistance to removal.

3 Claims, 5 Drawing Sheets

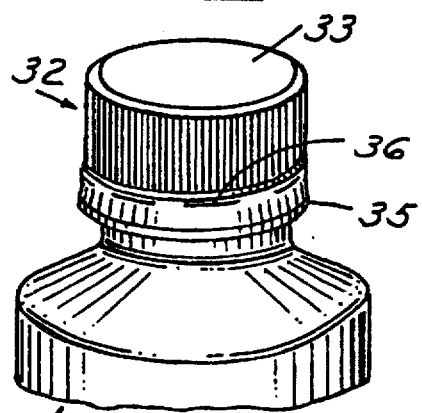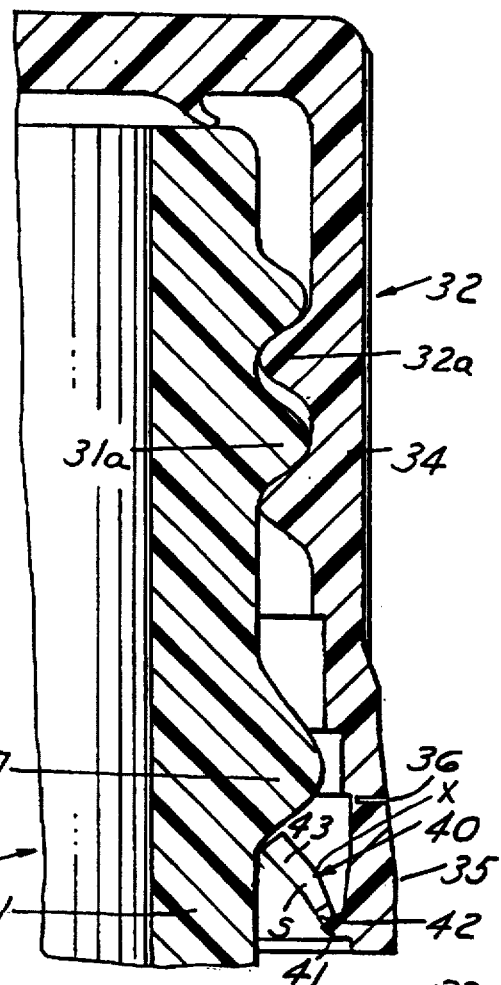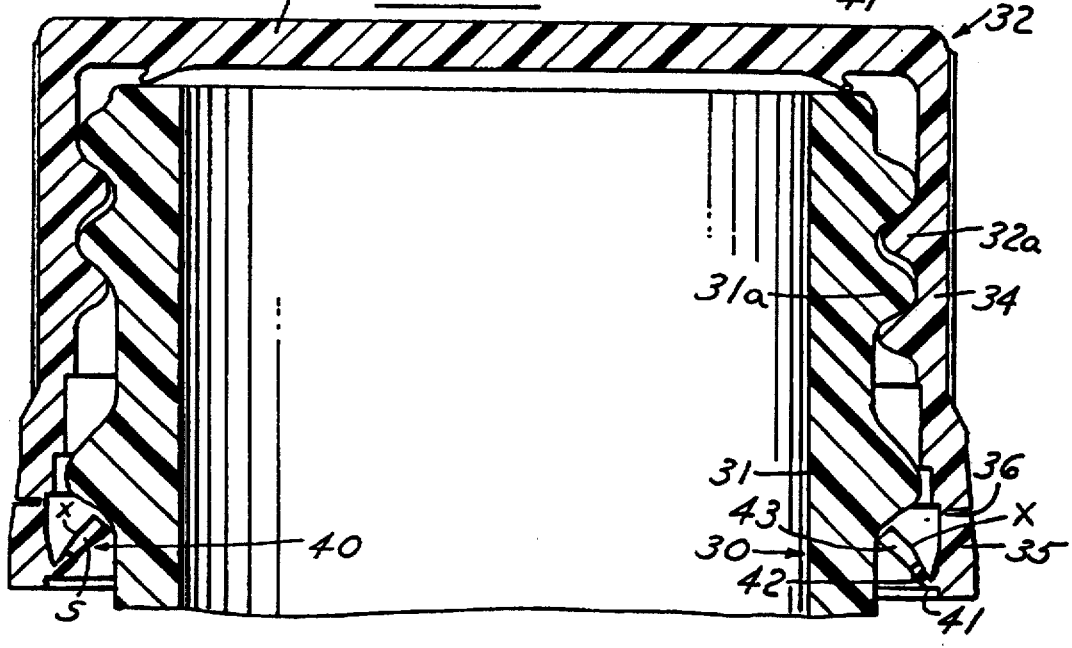

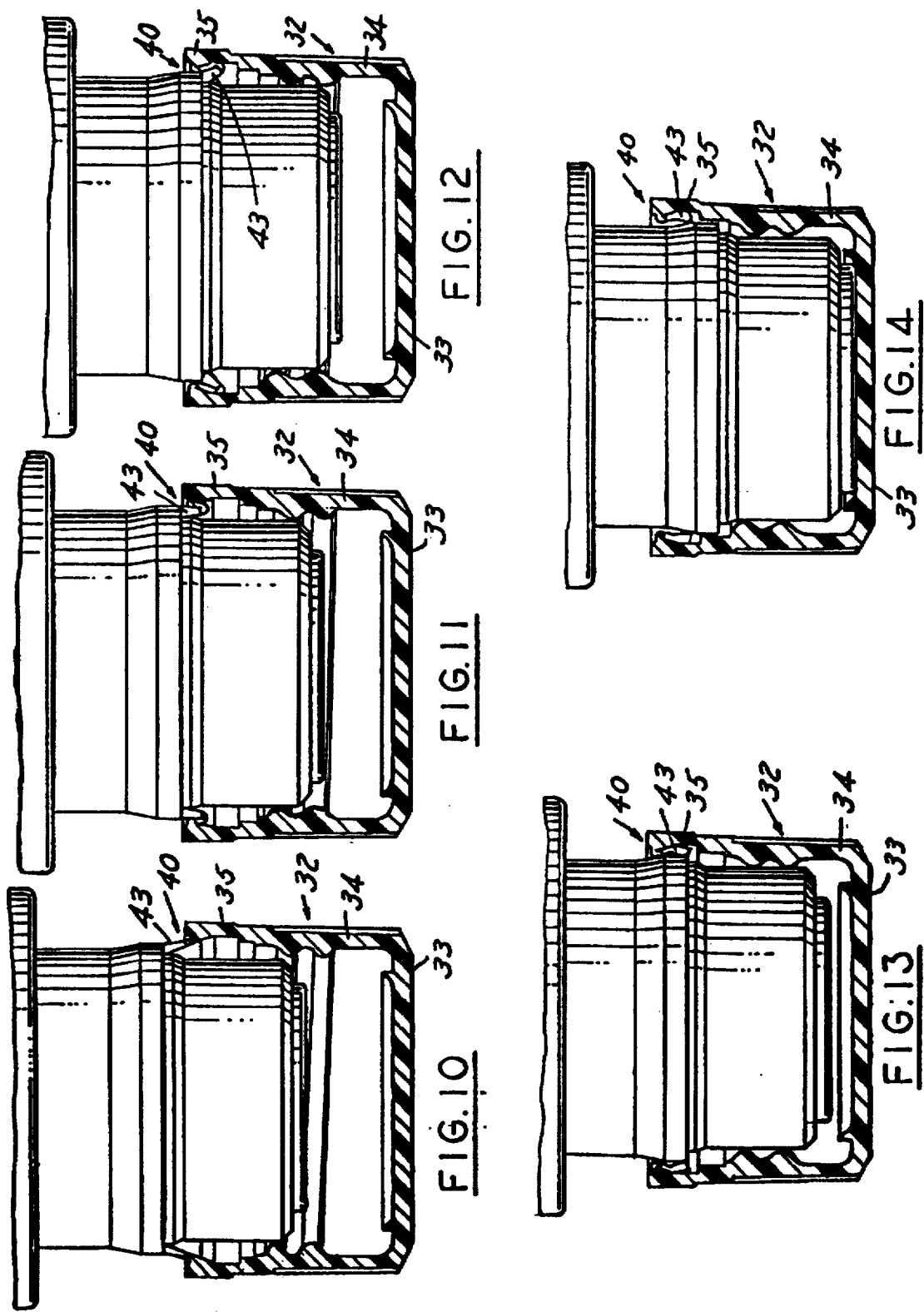

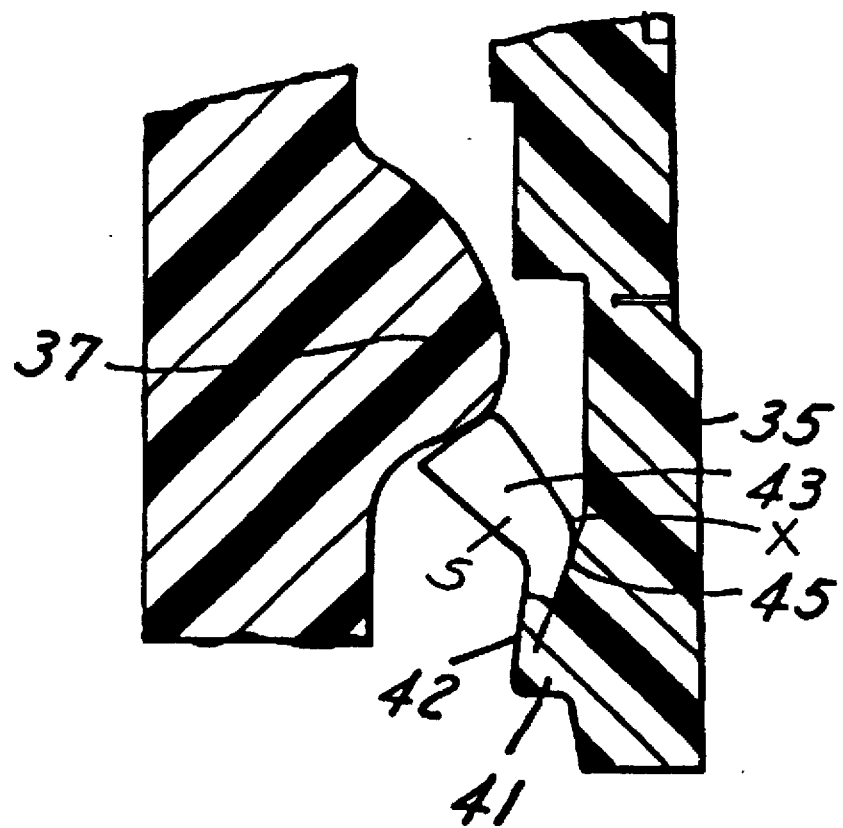

METHOD FOR MAKING A TAMPER INDICATING PACKAGE

This is a divisional application of Ser. No. 08/038,152 filed Mar. 26, 1993, now U.S. Pat. No. 5,443,171.

BACKGROUND AND SUMMARY OF THE INVENTION

In packaging of containers having closures thereon, it has been common to provide tamper indicating packages wherein the tamper indicating band is connected to the closure along a weakened line provided by a plurality of bridges or a scoreline and interengaging means between the band and the container are such that when the closure is unthreaded from the container, the band is severed along the bridge portions to indicate that the closure has been tampered with.

In U.S. Pat. No. 4,394,918 issued to Jean Gressen on Jul. 26, 1983, a threaded closure carries a hold ring that is joined to the bottom of the cap skirt by a series of breakable tabs and the hold ring has an inside diameter that is at least equal to the outside diameter of the cap skirt. A plurality of lock lugs supported on the ring are inclined upwardly and inwardly and are intended to hook behind a collar or mating ring on the container neck to prevent the hold ring from being lifted off the container neck when the cap is unscrewed.

In U.S. Pat. No. 4,550,844, having a common assignee with the present application, there is disclosed and claimed an arrangement wherein a continuous annular flange extends from the lower end of the tamper indicating band and is inclined upwardly and inwardly. Such an arrangement is effective but has the disadvantage in that continuous flange requires excessive force to apply the closure to the container in certain extreme tolerance conditions.

In an effort to reduce the force required to apply the closure, it has heretofore been suggested in U.S. Pat. No. 4,653,657 that the free edge of the continuous annular flange be provided with a plurality of segments to facilitate application of the closure.

U.S. Pat. No. 4,807,771 proposes the use of a plurality of spaced-apart ring segments on the tamper indicating band to define independently foldable ring segments and a plurality of resilient tabs connected to each end of each ring segment so that the free ends of the tabs bear on the bead or ledge of the container.

In U.S. Pat. No. 5,090,788, having a common assignee with the present application, there is disclosed a tamper indicating package comprising a container having a neck with a threaded finish, an annular bead on the neck, a plastic closure which includes a base wall and a depending peripheral skirt having threads interengaging the threads of the container, and a tamper indicating band attached to the skirt by a plurality of weakened portions defining a line of severing. An annular flange extends axially upwardly and inwardly from the tamper indicating band toward the base wall of the closure and comprises a first continuous annular flange portion connected to the band by a hinge portion and a second portion which has free ends of the segment portions engaging beneath the bead on the container when the closure is threaded onto the container. In one form, the second portion comprises a plurality of segment portions extending upwardly and inwardly from the first continuous portion. In another form, the second portion comprises a second continuous flange portion. The flange is bent intermediate its ends so that the second portion extends inwardly at a greater angle than the first continuous flange portion.

Among the objectives of the present invention are to provide an improved tamper indicating closure which is constructed and arranged to be easily applied to a container and function effectively in allowing the tamper band to separate from the closure during removal, and thus further inhibit tampering.

In accordance with the invention, the tamper indicating package comprising a container having a neck with a threaded finish, an annular bead on the neck below the threads, a plastic closure which includes a base wall and a depending peripheral skirt having threads interengaging the threads of the container, and a tamper indicating band attached to the skirt by a plurality of weakened portions defining a line of severing. An annular flange extends axially upwardly and inwardly from the tamper indicating band toward the base wall of the closure and comprises a first continuous annular flange portion connected to the band by a hinge portion and a second portion. The second portion comprises a plurality of segment portions extending upwardly and inwardly from the first continuous portion. The flange is bent intermediate its ends so that the second portion extends inwardly at a greater angle than the first continuous flange portion. The segment portions are separated by narrow slits such that when the closure is fully applied on a container, and the closure is rotated to remove the closure, the free ends of the adjacent segment portion engage a bead on the container and are moved radially inwardly and the sides of the slits adjacent the free ends contact one another in an interfering manner. This contact between the adjacent free ends of the segments strengthens the flange so that it is more difficult to invert the flange to its molded condition which would allow removal of the closure without severing the tamper band. The slits between the segments allow for easier application of the closure to a container finish than a closure with a continuous flange, by not having the high tensile stress induced in the continuous flange as it is stretched over the container bead. However, the slits become closed at the free ends during closure removal, and act much like a continuous flange. That is, it is difficult to invert the segment portions that define the flange as the closure is being removed because of the added compressive force generated because the free ends are contacting each other. This additional force enhances resistance to removal and makes it more likely that the band will sever along the weakened line rather than become inverted. This also inhibits tampering.

DESCRIPTION OF THE DRAWINGS

FIG. 1 is a fragmentary elevational view of a package embodying the invention.

FIG. 2 is a vertical sectional view of the package shown in FIG. 1.

FIG. 3 is a fragmentary sectional view of the package on an enlarged scale.

FIGS. 9, 10, 11, 12, 13 and 14 are partly diagrammatical sectional views showing the inversion of the flange from the as-molded position to the final position in closure.

FIG. 15 is a schematic diagram of the inversion of the flange on the tamper indicating band of the closure.

FIG. 16 is a sectional view similar to FIG. 3 showing the relative position of the container and closure during removal.

DESCRIPTION

Figure 4:
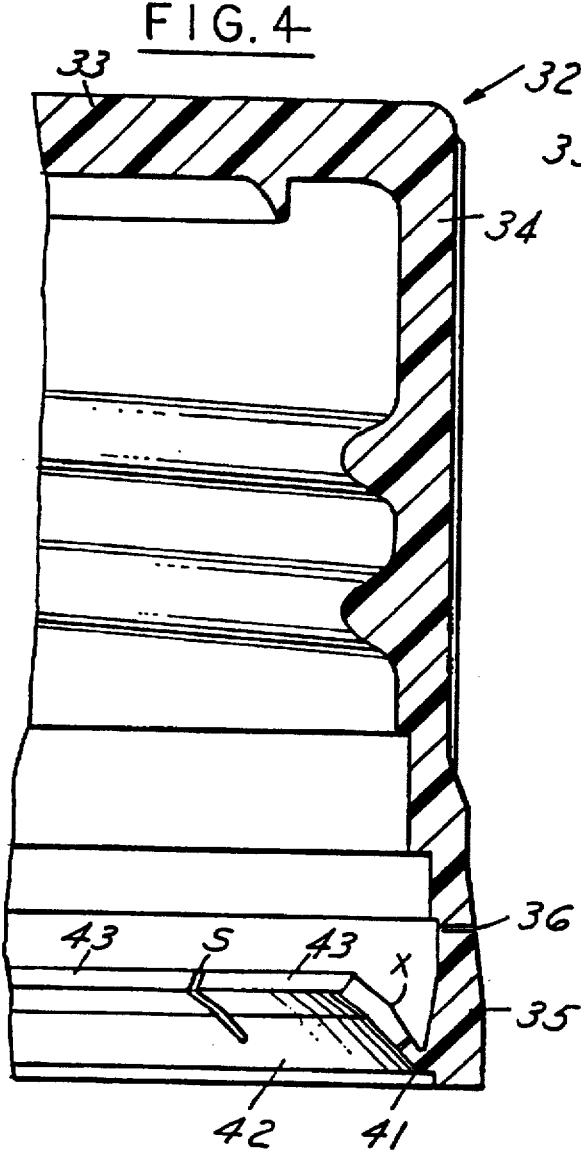
FIG. 4 is a fragmentary sectional view on an enlarged scale of a portion of the closure.

Referring to FIGS. 1–3, the tamper indicating package embodying the invention comprises a container 30 having a finish or neck 31 and a closure 32. The closure 32 is formed of thermoplastic material such as polypropylene or polyethylene which is molded as a single unit and comprises a generally disc shaped top or base wall 33 with a cylindrical depending skirt portion 34 (FIG. 2). A tamper indicating band 35 which is generally cylindrical is connected to the peripheral skirt 34 by a weakened line defined by bridges or scored portions of the skirt 34, herein shown as an interrupted scoreline 36. Interengaging threads 32a, 31a are provided on the closure and neck and cooperate to apply and hold the closure in position on the container. The container 30 includes an annular bead 37.

Figure 8A:
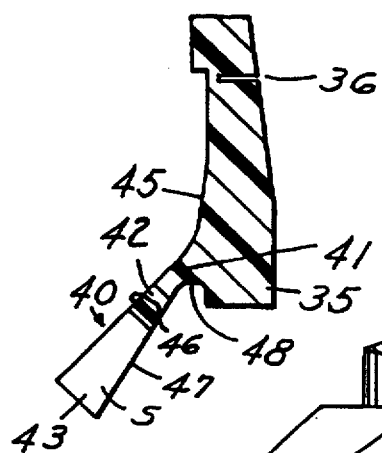
FIG. 8A is a fragmentary sectional view on an enlarged scale of a portion of the closure shown in FIG. 9.
Figure 8B:
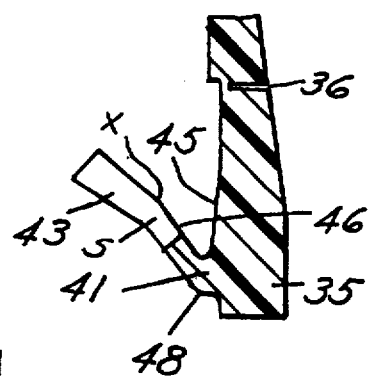
FIG. 8B is a fragmentary sectional view on an enlarged scale of a portion of the closure shown in FIG. 8A, after it has been formed to its final configuration.

Referring to FIGS. 2, 3, and 8B, an annular flange 40 is connected to the inner surface of the tamper indicating band by an integral hinge portion 41 that is spaced so that it extends radially inwardly of the inner surface of the tamper indicating band 35 and the flange 40 extends upwardly and inwardly toward the base wall of the closure. The flange 40 includes a first continuous annular flange portion 42 that extends from hinge portion 41 at a slight angle radially inwardly before the closure is applied to the container. The flange 40 further includes a second portion in the form of a plurality of integral circumferentially spaced segment portions 43 extending from the free edge of the first continuous flange portion 42. The flange 40 is bent at X intermediate its ends so that the free ends of the segment portions 43 extend at a different and greater angle with the axis of the closure than the first continuous flange portion 42 of the annular flange 40. The annular flange portion 42 thus has a first pivot or hinge relative to the band 35 through hinge portion 41 and the segment portions 43 have a second hinge with respect to the remainder of flange 40 at X. The first continuous flange portion 42 extends axially at a very small acute angle with respect to the band 35 so that it is substantially vertical before the closure is applied to the container.

The width of each segment portion 43 is at least several times greater than the thickness at its smaller cross section. The segment portions are generally rectangular and closely spaced apart by narrow slits S such that the segment portions comprise the major portion of the second portion. Preferably, the sides of the slits are parallel. The width of the slits S preferably ranges between 0.005 and 0.010 inch. The number of segment portions 43 is preferably eight but may be as few as four. The slits S preferably extend from the free edge of the segments beyond the bend line X so that the length of the segment portions 43 is greater than the corresponding length of flange portion 42. Satisfactory results have been achieved where segment portions 43 of the flange 40 comprise about 60% of the flange 40 while the flange portion 42 comprises about 40%. However, the length of the slits may vary. It is essential that the continuous flange portion 42 have a sufficient dimension or length so that the flange 40 will remain inverted, without heat forming and curing, as hereinafter described.

Figure 5:
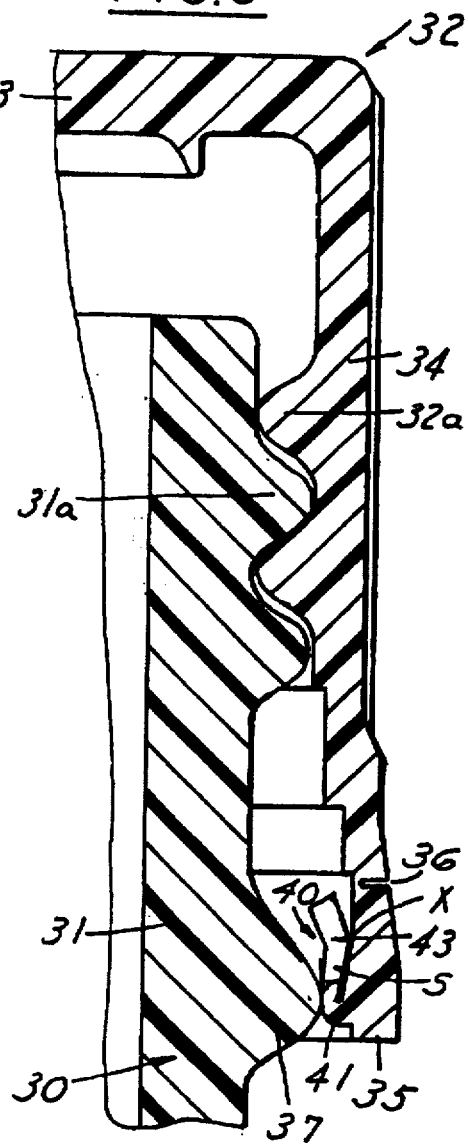
FIG. 5 is a fragmentary sectional view showing the application of the closure to the container.

As shown in FIG. 5, when the closure 32 is applied to the container 30, the continuous flange portion 42 first engages the annular bead 37 on the container 30 and flexes the flange 40 outwardly. During application, the first continuous portion flexes radially outwardly and the free ends of the segment portions 43 may contact the inner surface of band 35 during the application process. Further threading of the closure on the container causes segment portions 43 to flex radially inwardly beneath the bead 37 of the container 30 (FIG. 3). When the closure is applied, the first continuous flange portion 42 is substantially vertical and the free edges of segment portions 43 may engage the neck of the container below bead 37. The width of the slits is such that, when the closure is fully applied to a container, the free ends of adjacent segment portions 43 may contact one another in an interfering manner to inhibit tampering with the closure.

It has been found that this closure, which forms part of the tamper indicating package, requires a substantially lower application force in applying the closure and yet effectively provides the desired tamper indicating protection. It is believed that the considerable reduction in application force to pass over the bead on the container is achieved by reducing the hoop strength of the flange 40 toward its extremity. It is preferred that the bend in the flange 40 be at or near the juncture of the segment portions 43 with the flange portion 42. In such an arrangement, the segment portions 43 are at a thickness at the bend line X such that they are able to bend approximately along hinge line X. A radially outward force on the tips of the segment portions 43 will first cause bending at the second hinge line X and thus allow easier deflection of the segment portions 43 of the flange 40, thereby reducing application force. Where the length of the slits S is such that the base of the slits is intermediate the bend line X and the free ends of the segment portions 43, the segment portions 43 may flex adjacent the base of the slits that define the segment portions.

As shown in FIG. 2, when the closure is rotated to remove the closure from the container, the free edges of segment portions 43 engage the bead 37. Continued rotation of the closure 32 causes the flange 40 to bend along the line X and bring the segment portions 43 into engagement with the inner inclined surface of band 35 (FIG. 16). Upon further rotation of the closures the free ends of adjacent segment portions are moved radially inwardly by the further engagement with the bead 37 causing the sides of the slits S of substantially all the segment portions to contact one another adjacent the free ends. This contact between the adjacent free ends of the segments 43 strengthens the flange 40 so that it is more difficult to invert the flange 40 to its molded condition (FIG. 8A) which would allow removal of the closure without severing the tamper band 35. The slits S between the segments 43 allow for easier application of the closure to a container finish than a closure with a continuous flange, by not having the high tensile stress induced in the continuous flange as it is stretched over the container bead 37. However, the slits S become closed at the free ends during closure removal, and act much like a continuous flange. That is, it is difficult to invert the segment portions 43 that define the flange 40 as the closure is being removed because of the added compressive force generated and because the free ends are contacting each other as the flange 40 is being forced inwardly and downwardly. This additional force enhances resistance to removal and makes it more likely that the band will sever along the weakened line 36 rather than become inverted. This also inhibits tampering. Further rotation causes the band to be severed along the scoreline 36.

Figure 6:
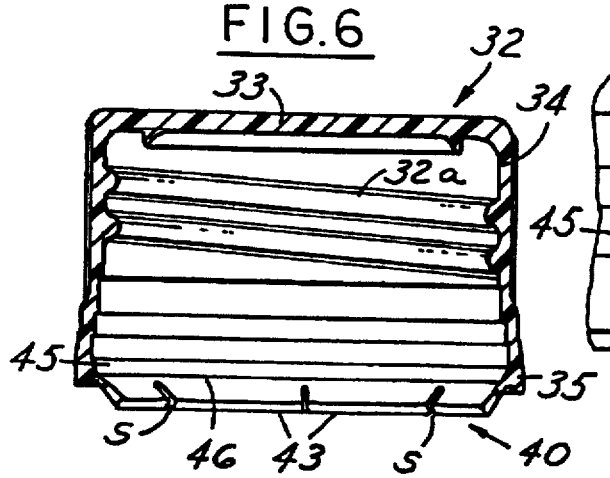
FIG. 6 is a sectional view of the closure as it is molded.
Figure 7:
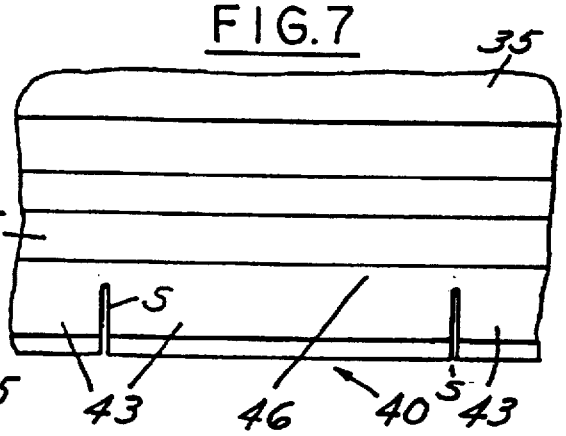
FIG. 7 is a fragmentary elevational view of a portion of the closure shown in FIG. 6.

Although the closure could, by complex molding apparatus, be made to the final configuration as shown in FIG. 4, it is preferred that the closure be made with the flange 40 extending radially and inwardly and axially outwardly away from the base wall of the closure (FIG. 8A). Accordingly, as shown in FIGS. 6 and 7, the closure 32 is preferably molded by injection molding or compression molding with the annular flange portion 42 and segments extending radially downwardly and inwardly relative to the base wall 33 of the closure 32 with the annular flange and segments being preferably aligned with one another. More specifically, as shown in FIG. 8A, the first hinge portion 41 connecting the annular flange portion 42 to the band 35 includes an upper inclined surface 45 that extends downwardly and inwardly from the inner surface of band 35 and that merges through an arc to a straight upper surface on the annular flange portion 42 and segment portions 43. In FIG. 8A, the lower surface 47 of the annular flange 40 is at an angle to the upper surface so that the flange 40 becomes increasingly thicker toward the free end. The lower surface 48 of the hinge 41 is generally horizontal connected by small arc to the interior surface of the peripheral skirt.

After molding to the configuration shown in FIG. 8A, the flange 40 can be deformed to provide the flange portion 42 at a substantially vertical angle and deform to form the bend X and then the flange 40 may be inverted in accordance with well-known techniques. However, it has been found by proper control of the inversion process, the continuous flange portion 42 can be deformed so that it is substantially vertical and the bend X can be simultaneously formed during the inversion. More specifically, by proper control of the inversion, the elastic limit of the flange portion 42 can be exceeded to decrease the angle which the flange portion 42 forms with the axis of the closure and the elastic limit of the flange at the line X can be exceeded to form the bend desired.

It has been found that the inversion of the annular flange portion 42 and segment portions 43 to form the separate angular relationship between the annular flange portion and the segment portion 43 is preferably achieved by a plunger or mandrel M such as shown in FIGS. 9–14 and comprises a free end having a cap centering cone 50, a thread location diameter for engaging the diameter of the threads of the closure, a first inclined portion, a pilot diameter 52 and a laterally inclined inverting shoulder 53 that engages the segment portions to invert the segment portions and the annular flange portion, as presently described.

Figure 9:
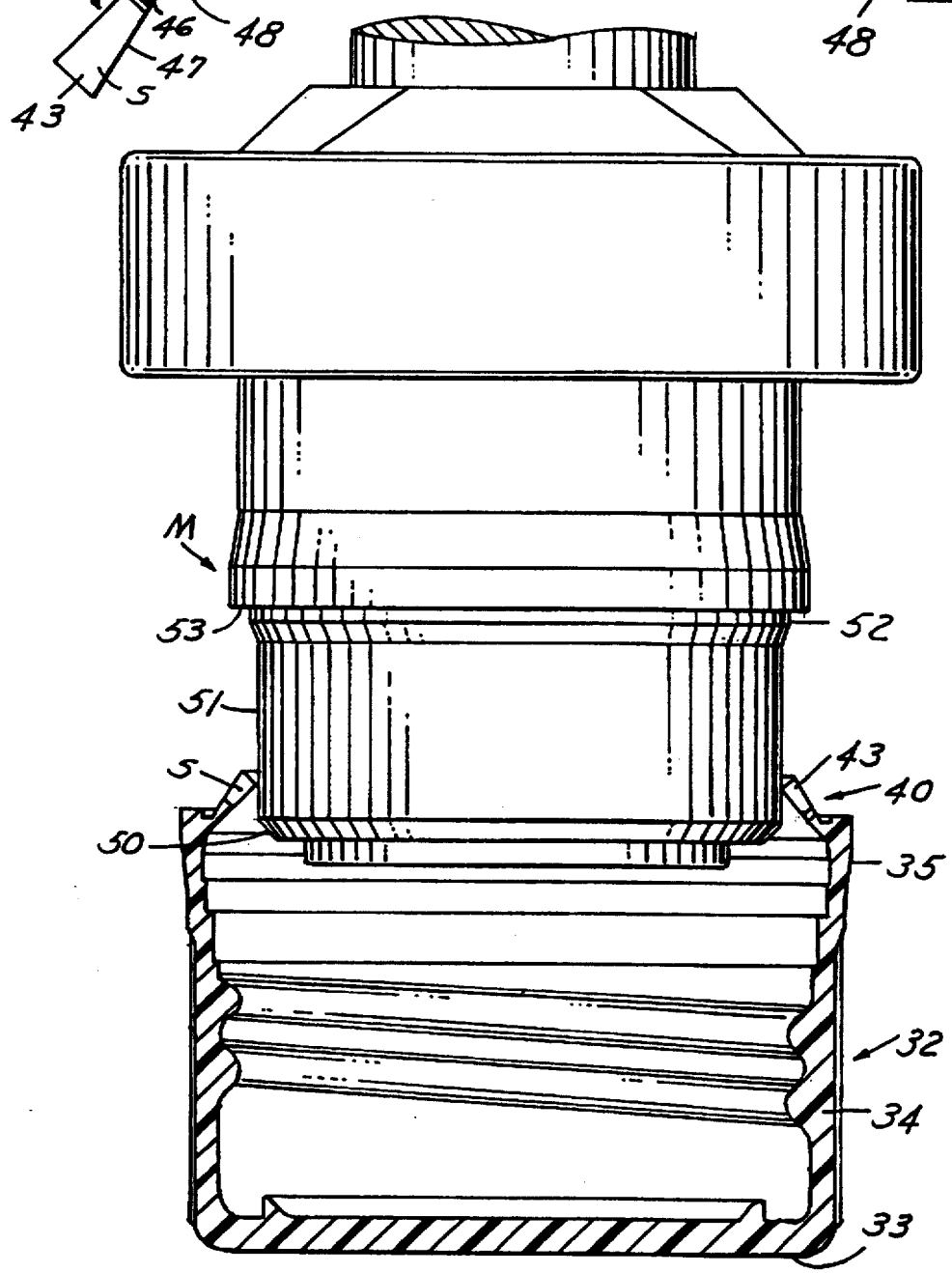

The successive steps during the inversion are shown in FIGS. 9–14 and include the following:

a) The closure is advanced into the tooling nest radially with respect to a machine, and is approximately located on center by an inverting mandrel M. The mandrel M may at this time be rotating in order to effect a subsequent scoring operation.

b) Relative axial movement takes place between the closure 32 and the mandrel M by cam actuation of the respective tooling (top and bottom).

c) The relative advance of the mandrel M to the closure 32 initially engages the segment portions 43 of the closure against the cap centering cone 50 (FIG. 9). This action centers the closure 32 under the mandrel M by displacing the closure sideways as necessary to correct misalignment.

d) As the above relative movement continues, the segment portions 43 engage the thread location diameter 51, and the friction therebetween may impart a rotational motion to the closure, if desired, such that when the segment portions 43 reach the pilot diameter 52, the closure is either at or close to the rotational speed of the mandrel (FIG. 10).

e) As the segment portions 43 engage the pilot diameter 52, they engage with more interference, and this is critical for this inversion method. The hoop strengths of the flange portion 42 and segment portions 43 direct the free ends of the segment portions 43 toward the mandrel M, and thus ensure that they do not slip over the inverting shoulder 53 (FIG. 11). Further, this interference provides further rotational drive to the cap, if desired, and for this reason it is preferred that the relative axial movement is in dwell at this time to ensure that there is little or no relative rotational movement between the closure and the inversion shoulder at the time of inversion. This reduces the possibility of scuffing of the tips of the segment portions.

It is desirable at this time that the thread location diameter 51 of the mandrel engage the closure threads to hold the closure 32 in firm concentric relationship to the mandrel M.

Further, relative axial movement of the mandrel M with respect to the lower tooling (and closure) causes the flange 40 to be folded downwardly, and initially to be contained within the annular space between the pilot diameter of the mandrel and the band 35 (FIG. 11). This causes a bending within the section of the flange 40, the center of this bending moving in the direction downward toward the top 33 of the (upside down) closure (FIG. 12).

This action continues, whereby the bending action passes along the flange toward its tip, and toward successively increasing thickness of segment portions 43 (FIG. 13). At some point in this process, the band is expanded such that the segment portions 43 are inverted by the axial movement of the mandrel (FIG. 13).

This action initially includes a stress in the segment at the bend line X, which causes a permanent bend in the flange 40 toward the inside of the closure.

As the mandrel M advances further, the shoulder 53 passes through the diameter of the first hinge 41 (FIG. 14).

This action causes the continuous annular flange 42 to be moved such that the flange portion 42 exceeds the elastic limit at the hinge 41 so that it remains in a substantially vertical position in the final closure after the closure is removed from the mandrel. This further reduces the interference of the hinge over the tamper bead of the container to which it is applied.

During withdrawal of the mandrel, the closure 32 is removed by a fixed stripper (not shown) which engages the rim of the closure 32, and extends at least 180° around the circumference of the closure (not illustrated).

The plunge invert tooling described thus has two major effects:

(a) Deforming the flange portion 42 back toward the closure wall 35.

(b) Forming the bend X to create a permanent bend, to allow the segment portions 43 to project radially inwardly to a greater angle than the first continuous flange portion 42.

It has been found that after inversion in the manner described above, the flange 40 is in stable condition and this has been achieved without the necessity of heating.

When the closure is applied to the container, the projections function to deter any attempts to tamper with the tamper indicating band by hooking a tool on the segment portions 43.

It can thus be seen that there has been provided a tamper indicating package with an improved arrangement for interengaging the closure with the container so that when the closure is removed the tamper indicating band remains on the container; wherein the closure can be readily applied to the container; and wherein the tamper indicating package effectively minimized tampering. Furthermore, the provision of the slits which provide for interference between the free ends of adjacent segment portions enhance the resistance to removal and inhibits tampering.

I claim:

1. A method of making a tamper indicating closure adapted to be applied to a container having a neck with a threaded finish, and an annular bead on said neck, said closure having an annular bend in an annular flange extending axially inwardly with respect to a base wall, which method comprises:

forming a plastic closure having a base wall, a depending peripheral skirt having threads for interengaging threads of the container, and a tamper indicating band attached to said skirt by at least one weakened portion defining a line of severing and an annular flange extending radially inwardly and axially outwardly with respect to the base wall, said annular flange comprising a continuous annular portion and a second portion having a free edge, said annular flange connected to the tamper indicating band by a hinge portion, said second portion of said annular flange having a plurality of circumferentially spaced narrow slits extending from the free edge and defining a plurality of circumferentially spaced segment portions separated by said narrow slits extending downwardly and outwardly from the continuous annular portion, said narrow slits having a narrow width and extending entirely through said flange to define said segment portions such that when the closure is fully applied to a container, and the closure is rotated to remove the closure, the free ends of the adjacent segment portions engage the annular bead on the container and are moved radially inwardly and the sides of the slits adjacent the free ends of substantially all the segment portions contact one another in an interfering manner to enhance resistance to removal and inhibit tampering, thereafter advancing a plunger into the closure to engage said annular flange to form said bend in the continuous annular portion intermediate the hinge portion and the free edge of said second portion, and to deform the continuous annular portion so that it forms a lesser bend with the axis of the closure than the bend formed initially, and to invert the annular flange so that it extends radially inwardly and upwardly relative to the base wall of the closure.

2. The method set forth in claim 1 wherein said slits are parallel.

3. The method set forth in claim 2 wherein the width of said slits is about 0.0005"–0.0010".

* * * * *